United States Patent [19]
Meyer, Jr.

[11] 3,711,755
[45] Jan. 16, 1973

[54] DC FISHING MOTOR SPEED AND STEERING CONTROL

[75] Inventor: Charles Paul Meyer, Jr., Bloomington, Ill.

[73] Assignee: Jetco Electronic Industries, Inc., El Paso, Tex.

[22] Filed: Dec. 12, 1969

[21] Appl. No.: 884,498

[52] U.S. Cl..................................318/139, 115/18
[51] Int. Cl....................................H02p 7/68
[58] Field of Search................318/17, 59, 66–68, 318/112, 139, 51, 55, 82, 83, 85, 98, 333, 349, 358, 504, 514, 4, 8, 9, 10; 307/12, 15, 30–34, 37–42; 115/18

[56] References Cited

UNITED STATES PATENTS

| 547,369 | 10/1895 | Brady | 318/349 X |
| 2,573,122 | 10/1951 | Weber | 307/32 X |
| 3,070,732 | 12/1962 | Crandall et al. | 307/38 X |
| 3,241,019 | 3/1966 | Gross | 318/139 |
| 3,045,937 | 7/1962 | Johnson | 318/82 X |

FOREIGN PATENTS OR APPLICATIONS

| 345,031 | 4/1960 | Switzerland | 318/112 |
| 545,116 | 2/1956 | Belgium | 318/82 |

Primary Examiner—Bernard A. Gilheany
Assistant Examiner—W. E. Duncanson, Jr.
Attorney—Mann, Brown, McWilliams & Bradway

[57] ABSTRACT

A simplified resistive circuit for controlling the speed and steering of a boat. One resistance enables selection of an equal speed for both motors and a second resistance provides a differential in the voltage applied to the two motors to provide a differential speed of the two motors and steering of the boat.

6 Claims, 8 Drawing Figures

PATENTED JAN 16 1973

Inventor
Charles P. Meyer, Jr.
By Mann, Brown, McWilliams & Bradway
Attys.

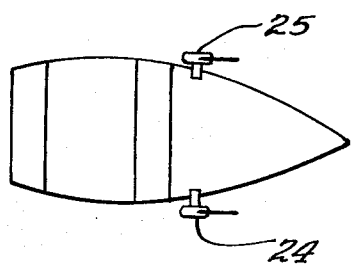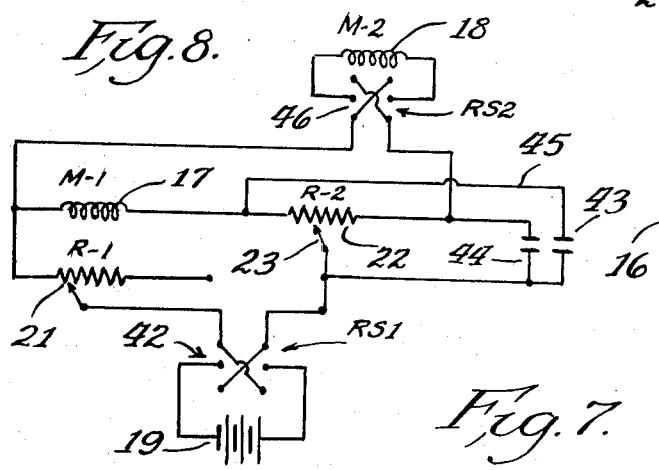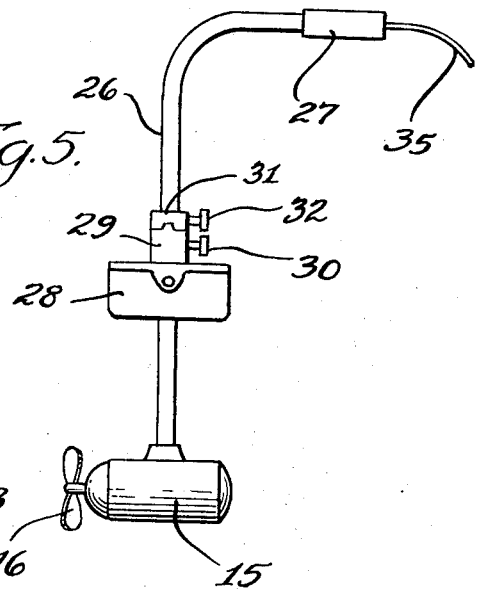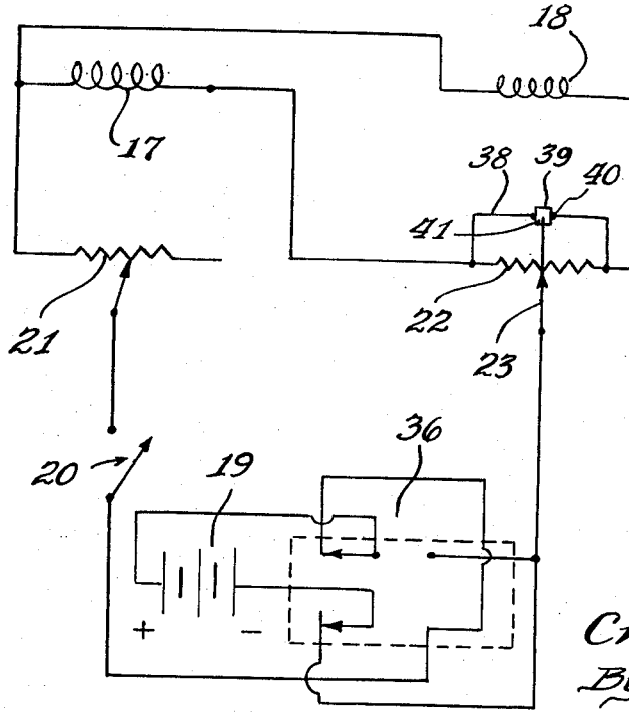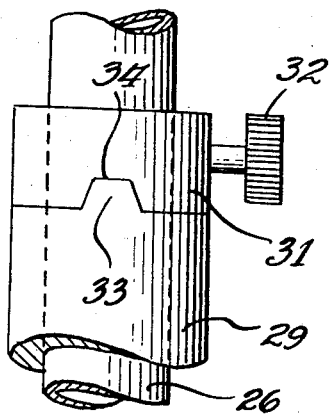

DC FISHING MOTOR SPEED AND STEERING CONTROL

The present invention is directed to new and useful improvements in resistive controls for fishing motors.

In recent years it has become increasingly popular to use a battery operated direct current motor for propelling a fishing boat at relatively slow speeds for trolling or slow movement while casting. Such motors are desirable because of their quietness of operation. The speed of such motors and the speed of the boats has been controlled through use of a resistance which varies the voltage applied to the motor and thus varies the speed. Steering of boats equipped with such motors has been accomplished through either a handle or linkage system which changes the angular thrust position of the propeller relative to the longitudinal axis of the boat. Linkages and handles are difficult to manipulate properly if a fisherman is attempting to steer the boat at the same time he is engaged in casting or landing a fish.

With the foregoing in mind, the major purposes of the present invention are to provide a simple, economical and easily manipulated system for both controlling the speed and steering of a fishing boat equipped with battery supplied electric motors, while allowing the fisherman to move about the boat at will and still control the boat.

These and other purposes of the invention will become more apparent in the course of the following specification and claims when taken with the accompanying drawings, in which:

FIG. 4 is a diagrammatic view of a boat utilizing the principles of the invention but with motors mounted on the sides of the boat;

FIG. 5 is a side view of a modified motor assembly;

FIG. 6 is an enlarged view of certain motor supporting details illustrated in FIG. 5;

FIG. 7 is a diagrammatic view of a modified form of circuit utilized in the invention; and FIG. 8 is a diagram of another circuit utilizing the principles of the invention.

Like elements are designated by like characters throughout the specification and drawings.

Figure 1:
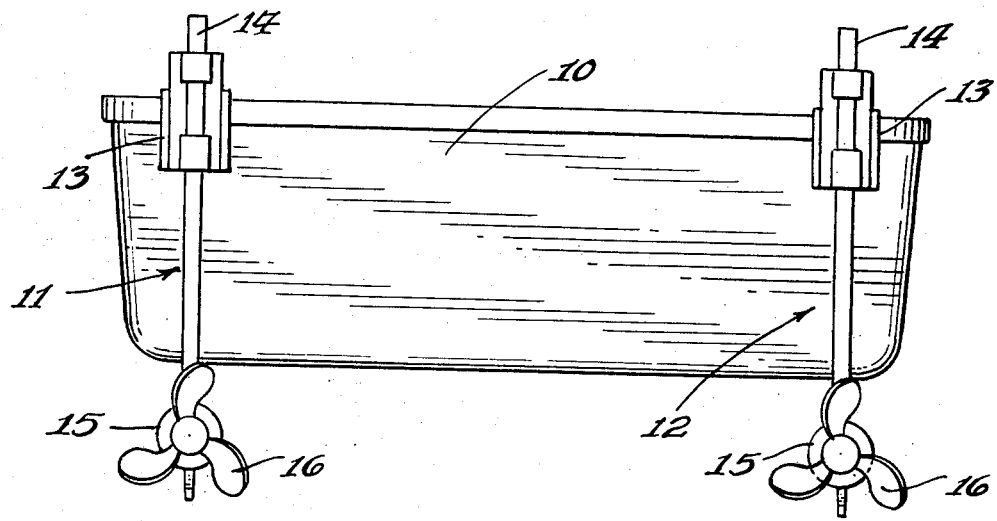
FIG. 1 is a rear view of a fishing boat equipped with a pair of DC motor driven propellers for propelling the boat.
Figure 3:
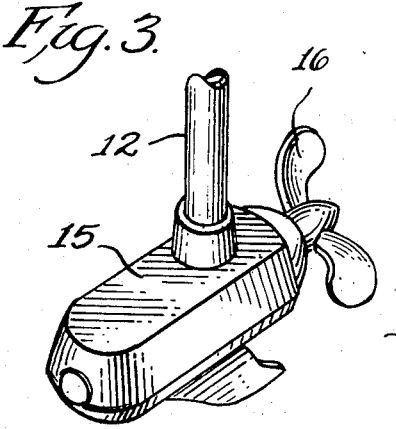
FIG. 3 is a perspective view of a typical electric outboard fishing motor of the type diagrammatically shown in FIG. 1.

With particular reference now to the drawings, and in the first instance to FIG. 1, the numeral 10 designates a fishing boat diagrammatically shown with a pair of electric outboard fishing motors 11 and 12 mounted on the stern of the boat. The motors may be mounted on the sides of the boat. The outboard motors generally designated at 11 and 12 are identical and are of the type illustrated in the perspective view in FIG. 3. Motors of this type typically include a clamping bracket and cradle assembly 13 which pivotally supports a propeller carrying shaft or column 14. A DC electric motor 15 may be carried by the lower end of each column or shaft 14 and coupled to a propeller 16 for effecting propulsion of the boat. The motors 15 may be permanent magnet motors.

Most outboard motors of this type, and which are in use today, include some provision for rotating the motor and propeller supporting columns about the axis thereof to change the direction of thrust of the propellers and thus effect steering of the boat. As opposed to this prior practice, the motors 15 are supported so as to provide a direction of thrust generally parallel to the longitudinal axis of the boat.

In accordance with the present invention, a simple and inexpensive control circuit is used for the energizing windings 17 and 18 for the DC drive motors of the motor assemblies 11 and 12. The energizing windings 17 and 18 are in parallel across the terminals of an electric storage battery 19. An on-off switch 20 enables energization and deenergization of the windings 17 and 18 to thus start and stop propulsion of the boat. A variable resistor 21 is in one of the power lines from one of the battery terminals so that it is in series with both windings 17 and 18. A variation in the amount of resistance in the circuit will cause a variation in the voltage applied to the windings 17 and 18 and thus enable speed control of both motors simultaneously. Increasing the resistance will decrease the voltage and speed of each motor by substantially the same amount, while decreasing the resistance will increase the speed of both motors by substantially the same amount.

A center tap resistor 22 is in the other power line and includes a movable arm 23 which is adapted to vary an additional resistance in series with each of the motor windings 17 and 18. In the center position of the arm 23 half of the resistance will be in series with winding 17 while half will be in series with winding 18 and the voltage and speed of the motors 17 and 18 will then be dependent upon the speed selected by the variable resistor 21.

Moving arm 23 of the resistor 22 to one side or another increases the resistance in series with one motor winding while decreasing the resistance in series with the other motor winding. An increase in resistance in series with one motor winding will reduce voltage applied to that motor winding while a decrease in resistance in series with the other motor winding will increase the voltage and speed of that particular motor.

Thus movement of the actuating arm 23 from the center tap position unbalances the motors to slow down one motor and speed up the other. The difference in motor speeds results in a different propulsive effort applied to opposite sides of the boat and thus enables steering.

The resistance 22 and actuating arm 23 may be set up so that turning of a control knob for the arm 23 to the right causes turning to the right, while turning the knob to the left causes turning to the left.

The simple circuit illustrated herein may be used with a small operator-carried panel or control box carrying the resistances 21 and 22 and with control knobs for the two resistances. The control box may be connected by cables through the columns to the motors and be of such a length that the operator or fisherman may easily move to any position of the boat and at the same time easily and quickly change speed and direction of the boat.

In FIG. 4 electric motor assemblies generally designated at 24 and 25 are mounted on the sides of the boat. In FIG. 5 the motor assemblies include columns 26 for supporting the same permanent magnet direct current motors 15 as utilized in FIGS. 1–3. Each of the motor supporting columns 26 is formed angularly at the upper end thereof to provide handles 27. A clamping cradle and bracket assembly is generally designated at 28 and includes an upstanding collar 29 through which the shaft or column 26 is received. The bracket and cradle assembly may be fixed to the shaft or column 26 as by means of the set screw 30. Shaft 26 has a collar 31 which is adjustably fixed along the length thereof as by a set screw 32. The collars 29 and 31 have interfitting tongue 33 and groove 34 portions to prevent relative rotation of the collars when the tongue and groove portions are engaged as illustrated in FIG. 6. The collars 29 and 31 include a pair of such tongue and groove portions located 180° apart with respect to the axis of shaft 26. By keeping set screw 30 in a loose position, the collar 31 simply rests upon collar 29 to fix the angular position of motor 15, as for example with the propeller thereof directed to move the boat forwardly. Each of the motor assemblies may then be reversed, as for example to stop movement of the boat or to back up simply by raising the shaft 26 to raise collar 31 above tongue 33 whereupon the shaft 26 may be rotated 180° to reverse the direction of thrust of the propeller 16.

The operating circuit for the motors is of the type illustrated in FIG. 2 or the type illustrated in FIG. 7 which is described hereinafter and leads through a cable 35 which extends through the shafts 26 to the motors 15.

Figure 2:
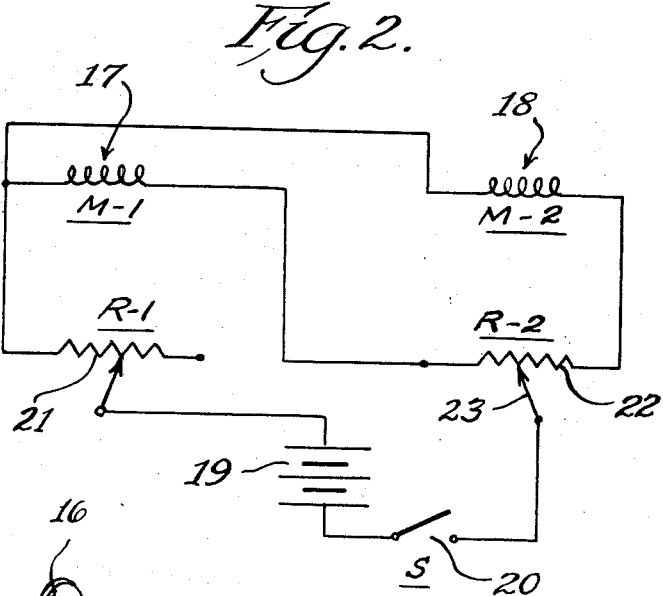
FIG. 2 is a circuit diagram for controlling the motors used in the arrangement of FIG. 1.

FIG. 7 illustrates a control circuit which includes all of the details of the circuit illustrated in FIG. 2 but with added circuit elements. In FIG. 7 the same circuit elements designated in FIG. 2 are designated with like numbers. In FIG. 7 a reversing switch 36 is provided between the terminals of the battery and the main energizing lines for the motor circuits. Reversing switch 36 enables reversal of the polarity of the energizing windings of the motors to provide reversal of both motors simultaneously for use in stopping the boat or backing the boat. The circuit of FIG. 7 may be utilized with motors of the type illustrated in FIGS. 4, 5 and 6 whereby switch 36 is used for backing or stopping of the boat while the swingable mount of the motors provides for reversal of the direction of thrust of a selected one of the two motors and thereby provide maximum turning effort by using forward thrust on one side of the boat and reverse thrust on the other.

In FIG. 7 a shunt circuit 38 may be provided around resistor 22. Movable contact arm 23 of the resistor 22 is extended and carries a switch contact element 39 which spans a pair of contacts 40 and 41 when the arm 23 is in the center tap or balanced position. When arm 23 is in the center tap position, shunt 38 acts to bypass the resistance 22 and thus take the series resistance provided for each motor out of the line, thus providing full power to the motors in the center tap position under regulation of the speed control resistor 21. When speed control resistor 21 is at its lowermost value, maximum voltage from the battery 19 will then be provided across the motor windings 17 and 18 for full speed thereof. As movable arm 23 moves away from the center position, it moves away from one of the contacts 40 and 41 depending upon the direction of movement and opens shunt 38 to thereby place the varying amounts of resistance in series with the two motor windings 17 and 18.

A combination of the circuit of FIG. 7 with the particular motor support arrangement of FIGS. 4, 5 and 6 allows the user maximum control. Full turning effort is provided through physical rotation through one of the motor shafts 26 while the motors are set at full speed and this is no great inconvenience to the fisherman since such full turning effort is usually desired when the fisherman is not trolling, casting or landing a fish, as, for example, when moving away from a dock. When in the act of fishing, both motors may be set for the forward position, and speed and steering control is attained through the movable arms of the resistors in FIG. 7. The reversing switch provides quick stopping or for backing out of an area which prevents turning movement of a boat.

FIG. 8 illustrates a modified circuit utilizing the same principles of the circuits disclosed in FIGS. 2 and 7 with an added reversing switch for one motor and a different form of circuit for bypassing the variable center tap resistor 22 as in FIGS. 2 and 7. The motor windings 17 and 18 of the two motors are in parallel across the power leads from the battery 19. A variable resistor 21 is in series with both motor windings so that when its value is changed it is effective to simultaneously change the speed of both of the motors. A reversing switch 42 is in the power lines from the terminals of battery 19 to enable reversal of the direction of rotation of both motors simultaneously to thus provide a simple and quick control for backing the boat or for reversing the thrust of both propellers to aid in slowing the boat. A center tap variable resistor 22 is connected with one portion in series with the power line to winding 17 and another portion in series with the power line to winding 18 as in FIGS. 2 and 7.

In FIG. 8, a double pole single throw switch 43 is in a first circuit line 44 which acts, when closed, to bypass resistor 22 in the one power line from the battery and leading to one of the motor windings 18, and in a second circuit line 45 which bypasses resistor 22 in the power line for motor winding 17. When switch 43 is normally open as shown, variable resistor 22 has portions thereof in circuit with the motor windings 17 and 18 so that the movable arm 23 of the center tap resistor may be used to differentially adjust the voltage applied to the motor windings 17 and 18 and thus differentially vary the speed of the motor windings for turning purposes. On the other hand, when switch 43 is closed, the circuits 44 and 45 bypass the resistor 22 so that the motor windings 17 and 18 then operate from a minimum to a maximum speed under control of resistor 21 which adjusts the speed of both motors simultaneously.

In FIG. 8 a reversing switch 46 is in the power lines to one of the motor windings 18 so as to allow selective reversal of the direction of rotation of that motor when it is operating under the speed control of resistor 21 as well as the differential resistor 22. This provides for maximum turning effort applied to a boat in that the motors may operate in opposite directions at the same time at full speed. Turning effort may also be increased when using the differential center tap resistor 22 in that reversing switch 46 enables one motor to be operated forwardly at one speed and the other motor to be operated rearwardly at different speed. This increases the turning effect over what is available with both motors operating in the same direction and at different speeds.

The system of FIG. 8 can be used with or without the rotatable motor supports of FIGS. 5 and 6.

The circuit of FIGS. 7 and 8, like that of FIG. 2, is readily usable with a small control panel or box carrying the switches and variable resistors so that the user can move about the boat at will and still have full and instantaneous control of the boat.

I claim:

1. A speed and direction control system for DC motor, battery supplied, drives of boats including a pair of DC motors each having a propeller, a circuit formed and adapted for connecting energizing windings of said motors to a source of direct current, the energizing windings of each motor being connected in parallel in said circuit, a first adjustable resistance connected in series with the circuit for both energizing windings whereby a variation in the resistance produces a variation in the voltage applied across each winding simultaneously to thereby produce a speed change of substantially the same amount in both motors, a second variable resistance having portions in series with each of said motor windings, and a variable tap for said second resistance, said variable tap being connected in one of the energizing lines of said circuit, said variable tap being adjustable from a center position adapted to provide equal amounts of resistance in series with each of the energizing windings of each motor to other positions differentially varying the respective amounts of resistance in series with each motor winding so that an increase in the resistance in series with one motor winding is accompanied by a decrease in the resistance of the other motor winding to thereby selectively increase the voltage and speed of one motor while decreasing the voltage and speed of the other motor to effect steering of a boat through a greater amount of propulsive force provided by one motor or the other.

2. A speed and direction control system for DC motor, battery supplied, drives of boats including a pair of DC motors each having a propeller, a circuit formed and adapted for connecting energizing windings of said motors to a source of direct current, the energizing windings of each motor being connected in parallel in said circuit, a first adjustable resistance connected in series with the circuit for both energizing windings whereby a variation in the resistance produces a variation in the voltage applied across each winding simultaneously to thereby produce a speed change of substantially the same amount in both motors, a second variable resistance having portions in series with each of said motor windings, a variable tap for said second resistance, said variable tap being connected in one of the energizing lines of said circuit, said variable tap being adjustable from a center position adapted to provide equal amounts of resistance in series with each of the energizing windings of each motor to other positions differentially varying the respective amounts of resistance in series with each motor winding so that an increase in the resistance in series with one motor winding is accompanied by a decrease in the resistance of the other motor winding to thereby selectively increase the voltage and speed of one motor while decreasing the voltage and speed of the other motor to effect steering of a boat through a greater amount of propulsive force provided by one motor or the other, each of said motors being supported on a column, said column being rotatably supported on a boat clamping bracket assembly, said column and bracket assembly having cooperating collars with interfitting projection and groove means therein adapted to prevent rotation of said columns, said columns being in slidable engagement with the collars of said bracket assemblies to permit disengagement of said tongue and groove means to allow rotation of said columns and a reversal of the direction of thrust of the propellers carried by said columns.

3. The system of claim 1 characterized by and including a reversing switch in said circuit to allow reversal of the direction of rotation of said motors.

4. A speed and direction control system for DC motor, battery supplied, drives of boats including a pair of DC motors each having a propeller, a circuit formed and adapted for connecting energizing windings of said motor to a source of direct current, the energizing windings of each motor being connected in parallel in said circuit, a first adjustable resistance connected in series with the circuit for both energizing windings whereby a variation in the resistance produces a variation in the voltage applied across each winding simultaneously to thereby produce a speed change of substantially the same amount in both motors, a second variable resistance having portions in series with each of said motor windings, a variable tap for said second resistance, said variable tap being connected in one of the energizing lines of said circuit, said variable tap being adjustable from a center position adapted to provide equal amounts of resistance in series with each of the energizing windings of each motor to other positions differentially varying the respective amounts of resistance in series with each motor winding so that an increase in the resistance in series with one motor winding is accompanied by a decrease in the resistance of the other motor winding to thereby selectively increase the voltage and speed of one motor while decreasing the voltage and speed of the other motor to effect steering of a boat through a greater amount of propulsive force provided by one motor or the other, said circuit including shunt means formed around said second variable resistance and having means operable when said variable tap is in said center position to bypass said variable resistor and in other positions of said variable tap being open-circuited to allow variation of the resistance in series with the motor windings.

5. The system of claim 1 characterized by and including a reversing switch in circuit leads across one of the motor windings to thereby enable a reversal of the direction of rotation of the motor of that winding to enable turning of the boat.

6. A speed and direction control system for DC motor, battery supplied, drives of boats including a pair of DC motors each having a propeller, a circuit formed and adapted for connecting energizing windings of said motor to a source of direct current, the energizing windings of each motor being connected in parallel in said circuit, a first adjustable resistance connected in series with the circuit for both energizing windings whereby a variation in the resistance produces a variation in the voltage applied across each winding simultaneously to thereby produce a speed change of substantially the same amount in both motors, a second variable resistance having portions in series with each of said motor windings, a variable tap for said second resistance, said variable tap being connected in one of the energizing lines of said circuit, said variable tap being adjustable from a center position adapted to provide equal amounts of resistance in series with each of the energizing windings of each motor to other positions differentially varying the respective amounts of resistance in series with each motor winding so that an increase in the resistance in series with one motor winding is accompanied by a decrease in the resistance of the other motor winding to thereby selectively increase the voltage and speed of one motor while decreasing the voltage and speed of the other motor to effect steering of a boat through a greater amount of propulsive force provided by one motor or the other, said circuit including parallel circuits leading from one energizing lead of said circuit to an energizing lead for each motor winding while bypassing said second variable resistance, and switch means for selectively closing said parallel circuits and opening the same, opening of said parallel circuits being effective to enable said second variable resistance to differentially control the speed of said motors while closing of said parallel circuits is effective to bypass said second variable resistance.

* * * * *